US 11,597,328 B2

(12) United States Patent
Fukawatase et al.

(10) Patent No.: US 11,597,328 B2
(45) Date of Patent: Mar. 7, 2023

(54) VEHICLE SEATS

(71) Applicant: TOYOTA JIDOSHA KABUSHIKI KAISHA, Toyota (JP)

(72) Inventors: Osamu Fukawatase, Miyoshi (JP); Nobuhiro Nakano, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/485,994

(22) Filed: Sep. 27, 2021

(65) Prior Publication Data

US 2022/0097584 A1 Mar. 31, 2022

(30) Foreign Application Priority Data

Sep. 30, 2020 (JP) .............. JP2020-166255

(51) Int. Cl.
*B60R 7/08* (2006.01)
*B60N 3/02* (2006.01)
*B60R 11/00* (2006.01)
*B60N 2/90* (2018.01)

(52) U.S. Cl.
CPC ............. *B60R 7/08* (2013.01); *B60N 3/023* (2013.01); *B60N 2002/905* (2018.02); *B60R 2011/0015* (2013.01); *B60R 2011/0071* (2013.01)

(58) Field of Classification Search
CPC ..... B60R 2011/0015; B60R 2011/0071; B60R 7/043; B60R 7/12; B60R 7/08; B60N 2002/905
USPC ..................................................... 296/37.15
See application file for complete search history.

(56) References Cited

U.S. PATENT DOCUMENTS

| | | | | |
|---|---|---|---|---|
| 1,670,962 A * | 5/1928 | Hall | ........................ | B60R 7/08 |
| | | | | 135/34.2 |
| 1,697,763 A * | 1/1929 | Hall | ........................ | B60R 7/12 |
| | | | | 224/915 |
| 6,405,909 B1 * | 6/2002 | Burnett | ................... | F41C 33/06 |
| | | | | D6/552 |
| 8,887,973 B2 * | 11/2014 | DeVolder | .................. | B60R 7/14 |
| | | | | 224/275 |
| 2005/0253426 A1 * | 11/2005 | Wesling | ................ | B60N 2/879 |
| | | | | 297/188.01 |
| 2011/0186607 A1 * | 8/2011 | Ward | ....................... | B60R 7/08 |
| | | | | 224/275 |
| 2012/0120626 A1 * | 5/2012 | Akaike | ................... | B60R 11/02 |
| | | | | 361/807 |
| 2012/0187265 A1 * | 7/2012 | Bakerman | ................ | B60R 7/12 |
| | | | | 248/220.22 |
| 2014/0042781 A1 * | 2/2014 | Reeves | .................. | B60R 7/043 |
| | | | | 297/163 |

(Continued)

FOREIGN PATENT DOCUMENTS

FR 2879144 A1 * 6/2006
JP H06286527 A 10/1994

(Continued)

*Primary Examiner* — Jason S Morrow
(74) *Attorney, Agent, or Firm* — Dinsmore & Shohl LLP (57) ABSTRACT

Vehicle seats that includes: a pair of seatbacks of front seats spaced apart in a vehicle width direction; and a pair of retaining portions provided at rear face sides of the pair of seatbacks, the pair of retaining portions configured to allow a rod-shaped member to span between the seatbacks, the rod-shaped member being grippable by a vehicle occupant sitting at a rear seat middle.

12 Claims, 8 Drawing Sheets

(56) References Cited

U.S. PATENT DOCUMENTS

2014/0246346 A1* 9/2014 Franco ................... B60R 7/043
                                                        206/335
2016/0297369 A1* 10/2016 Strakelijahn .............. B60R 7/12
2017/0015252 A1* 1/2017 Tchetgen ................. B60N 2/80

FOREIGN PATENT DOCUMENTS

| JP | 2001-322471 A | 11/2001 |
| JP | 2016-132279 A | 7/2016 |

* cited by examiner

VEHICLE SEATS

CROSS-REFERENCE TO RELATED APPLICATION

This application is based on and claims priority under 35 USC 119 from Japanese Patent Application No. 2020-166255 filed on Sep. 30, 2020, the disclosure of which is incorporated by reference herein.

BACKGROUND

Technical Field

The present disclosure relates to seats for a vehicle.

Related Art

Japanese Patent Application Laid-Open (JP-A) No. 2016-132279 discloses a technology in which an assist grip is provided at a rear face side of a seatback of a vehicle seat. The assist grip is provided along the seat width direction of a front seat and may be gripped by a vehicle occupant sitting on a rear seat.

In general, front seats of a vehicle are formed as separate seats and rear seats as a bench seat. Therefore, assist grips provided at seatbacks of front seats are divided between the right side (a right side seat) and left side (a left side seat) of the front seats. When a vehicle occupant is sitting on a middle seat of a rear seat, because a gap is formed between the right side seat and the left side seat, there is no dedicated assist grip at the front side of the vehicle occupant in the vehicle front-and-rear direction.

SUMMARY

In consideration of the circumstances described above, an object of the present disclosure is to provide vehicle seats that enable a vehicle occupant to support the body of the vehicle occupant, who is sitting on a middle seat of a bench seat disposed at the rear side in a vehicle front-and-rear direction of separate seats.

Vehicle seats according to a first aspect of the present disclosure include: a pair of seatbacks of front seats spaced apart in a vehicle width direction; and a pair of retaining portions provided at rear face sides of the pair of seatbacks, the pair of retaining portions configured to allow a rod-shaped member to span between the seatbacks, the rod-shaped member being grippable by a vehicle occupant sitting at a rear seat middle.

In the vehicle seats according to the first aspect of the present disclosure, the pair of seatbacks of the front seats are disposed to be spaced apart in the vehicle width direction. The respective retaining portions are provided at the rear face sides of the seatbacks. A rod-shaped member that may be gripped by a vehicle occupant sitting at the rear seat middle is enabled by the pair of retaining portions to span between the seatbacks. For example, the vehicle occupant sits on a middle seat (the "rear seat middle") of a bench seat disposed at the rear side in the vehicle front-and-rear direction of the pair of seatbacks, and the rod-shaped member is disposed at the front side of the vehicle occupant in the vehicle front-and-rear direction. Therefore, the vehicle occupant sitting at the rear seat middle may support their body by gripping the rod-shaped member.

In this structure, because the front seats are disposed to be spaced apart in the vehicle width direction, the front seats are what is known as separate seats, while the rear seat is what is known as a bench seat. The terms "front seats" and "rear seat" as used herein refer to a relative front-and-rear relationship; the front seats are not necessarily seats at a vehicle front portion. For example, the front seats may be middle seats in the vehicle front-and-rear direction of three seat rows.

In vehicle seats according to a second aspect of the present disclosure, in the vehicle seat according to the first aspect, the rod-shaped member is retained at the retaining portions in a state in which gaps in a seat vertical direction and a seat front-rear direction are present between the rod-shaped member and the retaining portions.

In the vehicle seats according to the second aspect of the present disclosure, positions of the rod-shaped member in the seat vertical direction and the seat front-and-rear direction may be regulated by the rod-shaped member being retained at the retaining portions in the state with gaps in the seat vertical direction and the seat front-and-rear direction. That is, even if respective positions in the seat vertical direction and positions in the seat front-and-rear direction of the pair of seatbacks are offset in accordance with reclining angles and seat sliding of the seatback of one of the vehicle seats and the seatback of the other of the vehicle seats, the positions of the rod-shaped member may adjust thereto due to the gaps provided between the rod-shaped member and the retaining portions.

In vehicle seats according to a third aspect of the present disclosure, in the vehicle seat according to the first aspect or the second aspect, each retaining portion includes: a rest portion on which the rod shaped member is to be rested; and a cover portion that is opposable with the rest portion, the cover portion being closed and impeding a fall of the rod-shaped member in a state in which the cover portion is disposed to oppose the rest portion.

In the vehicle seats according to the third aspect of the present disclosure, each retaining portion is provided with the rest portion and the cover portion, and the rod-shaped member is rested on the rest portion. The cover portion is opposable with the rest portion. In the state in which the cover portion is opposed with the rest portion, the cover portion is closed and the rod-shaped member is retained between the cover portion and the rest portion.

In vehicle seats according to a fourth aspect of the present disclosure, in the vehicle seat according to the first aspect or the second aspect, the pair of retaining portions include: an accommodating member structuring one of the retaining portions, the accommodating member being provided at one of the pair of seatbacks and accommodating the rod-shaped member, such that the rod-shaped member protrudes from the accommodating member in a seat width direction; and a support member structuring another of the retaining portions, the support member being provided at another of the pair of seatbacks and supporting a distal end portion of the rod-shaped member protruding from the accommodating member.

In the vehicle seats according to the fourth aspect of the present disclosure, the pair of retaining portions is provided with the accommodating member that constitutes one of the retaining portions and the support member that constitutes the other of the retaining portions. The accommodating member is provided at the one of the pair of seatbacks. The rod-shaped member is accommodated at the accommodating member to be capable of protruding in the seat width direction. The support member is provided at the other of the pair of seatbacks. The support member supports the distal end portion of the rod-shaped member that protrudes from the accommodating member.

Thus, in the present disclosure, the rod-shaped member spans between the pair of seatbacks by the rod-shaped member protruding in the seat width direction from the accommodating member provided at the one seatback side and the distal end portion of the rod-shaped member being supported at the support member provided at the other seatback side. Thus, in the present disclosure, a vehicle occupant sitting at the rear seat middle may grip the rod-shaped member, and the vehicle occupant may support their body by gripping the rod-shaped member.

In vehicle seats according to a fifth aspect of the present disclosure, in the vehicle seat according to the first aspect or the second aspect, the pair of retaining portions include: an axle portion structuring one of the retaining portions, the axle portion being provided at a rear face side of one of the pair of seatbacks and supporting a proximal end portion of the rod-shaped member, an axial direction of the axle portion being in a vehicle front-rear direction; and a receiving portion structuring another of the retaining portions, the receiving portion being provided at a rear face side of another of the pair of seatbacks and retaining a distal end portion of the rod-shaped member.

In the vehicle seats according to the fifth aspect of the present disclosure, the pair of retaining portions is provided with the axle portion that constitutes one of the retaining portions and the receiving portion that constitutes the other of the retaining portions. The axle portion is provided, with the axial direction thereof along the vehicle front-and-rear direction, at the rear face side of the one of the pair of seatbacks and supports the proximal end portion of the rod-shaped member. Thus, the rod-shaped member turns about the axle portion in the vehicle width direction and the vehicle vertical direction. The receiving portion is provided at the rear face side of the other of the pair of seatbacks and retains the distal end portion of the rod-shaped member.

Because the rod-shaped member is turnable about the axle portion with the distal end portion side of the rod-shaped member serving as a free end, in a state in which the distal end portion of the rod-shaped member is retained by the receiving portion, the rod-shaped member spans between the pair of seatbacks. Thus, in the present disclosure, a vehicle occupant sitting at the rear seat middle may grip the rod-shaped member, and the vehicle occupant may support their body by gripping the rod-shaped member.

In vehicle seats according to a sixth aspect of the present disclosure, in the vehicle seat according to the third aspect, the deployment and stowing mechanism putting each retaining portion into either a deployed state in which use of the retaining portion is enabled or a stowed state in which use of the retaining portion is disabled.

In the vehicle seats according to the sixth aspect of the present disclosure, the deployment and stowing mechanism is provided at each retaining portion. The deployed state of the retaining portion or the stowed state of the retaining portion is attained by the deployment and stowing mechanism. In the deployed state of the retaining portion, the retaining portion may be used. In the stowed state of the retaining portion, the retaining portion cannot be used. The meaning of the term "stowed" as used herein is intended to include a state in which the retaining portion simply cannot be used; the retaining portion may be exposed to a cabin interior side of the seatback.

In vehicle seats according to a seventh aspect of the present disclosure, in the vehicle seat according to the third aspect or the sixth aspect, each retaining portion further includes a closing mechanism that closes the cover portion to be opposable with the rest portion, the closing mechanism including: a pendulum member including one end portion, another end portion and a first axle portion that is provided along the vehicle width direction, the one end portion being pressed by the rod-shaped member and the pendulum member turning about the first axle portion in a case in which the rod-shaped member is rested on the rest portion; and a seesaw member including one end portion, another end portion and a second axle portion that is provided along the vehicle width direction, and in a case in which the rod-shaped member is rested on the rest portion and the pendulum member turns about the first axle portion, the other end portion of the pendulum member abutting against the one end portion of the seesaw member, the seesaw member turning about the second axle portion, and the other end portion of the seesaw member abutting against the cover portion and causing the cover portion to turn about a third axle portion in a direction to oppose the rest portion, the third axle portion being provided along the vehicle width direction.

In the vehicle seats according to the seventh aspect of the present disclosure, the retaining portion is further provided with the closing mechanism. The cover portion is closed opposably with the rest portion by the closing mechanism. This closing mechanism includes the pendulum member and the seesaw member. The pendulum member is specified such that when the rod-shaped member is rested on the rest portion, the one end portion of the pendulum member is pressed by the rod-shaped member and the pendulum member turns about the first axle portion provided along the vehicle width direction. Correspondingly, when the rod-shaped member is rested on the rest portion and the pendulum member turns about the first axle portion, the another end portion of the pendulum member abuts against the one end portion of the seesaw member and the seesaw member turns about the second axle portion provided along the vehicle width direction. The another end portion of the seesaw member abuts against the cover portion, and the cover portion turns in the direction to oppose the rest portion about the third axle portion provided along the vehicle width direction.

That is, in the present disclosure, when the rod-shaped member is rested on the rest portion of the retaining portion, via the one end portion of the pendulum member, the pendulum member is turned about the first axle portion, the another end portion of the pendulum member abuts against the one end portion of the seesaw member, and the seesaw member is turned about the second axle portion. As a result, the another end portion of the seesaw member abuts against the cover portion, the cover portion is turned about the third axle portion in the direction to oppose the rest portion, and the cover portion is closed.

As described above, the vehicle seats according to the first aspect of the present disclosure have an excellent effect in that a vehicle occupant sitting on a middle seat of a bench seat disposed at the rear side in the vehicle front-and-rear direction of separate seats may support the body of the vehicle occupant.

The vehicle seats according to the second aspect of the present disclosure have an excellent effect in that, even if positions in the seat vertical direction and positions in the seat front-and-rear direction of the pair of seatbacks are offset from one another, positions of the rod-shaped member may adjust thereto.

The vehicle seats according to the third aspect of the present disclosure have an excellent effect in that the rod-shaped member can span between the pair of seatbacks as a result of the rod-shaped member being retained at the pair of retaining portions.

The vehicle seats according to the fourth aspect of the present disclosure have an excellent effect in that the rod-shaped member can span between the pair of seatbacks as a result of the rod-shaped member protruding from the accommodating member.

The vehicle seats according to the fifth aspect of the present disclosure have an excellent effect in that the rod-shaped member can span between the pair of seatbacks as a result of the rod-shaped member being turned about the axle portion and the distal end portion of the rod-shaped member being retained by the receiving portion.

The vehicle seats according to the sixth aspect of the present disclosure have an excellent effect in that the retaining portion may be deployed when the retaining portion is to be used and the retaining portion may be stowed when the retaining portion is not to be used.

The vehicle seats according to the seventh aspect of the present disclosure have an excellent effect in that the cover portion may be closed to the rest portion when the rod-shaped member is rested on the rest portion.

BRIEF DESCRIPTION OF THE DRAWINGS

Exemplary embodiments of the present disclosure will be described in detail based on the following figures, wherein.

DETAILED DESCRIPTION

Below, vehicle seats according to exemplary embodiments of the present disclosure are described using the attached drawings. The arrow FR that is shown where appropriate in the drawings indicates a front direction of the vehicle seat (a direction in which a seat occupant is facing), the arrow UP indicates an upper direction of the vehicle seat, the arrow RH indicates the right direction of the vehicle seat and the arrow LH indicates the left direction of the vehicle seat. Below, where descriptions are given simply using the directions front, rear, upper, lower, left and right, unless otherwise specified, these represent the front and rear of the vehicle seat, upper and lower of the vehicle seat, and left and right in the vehicle width direction when facing in a progress direction.

First Exemplary Embodiment

—Structure of the Vehicle Seats—

First, structure of the vehicle seats according to a first exemplary embodiment is described.

Figure 1:
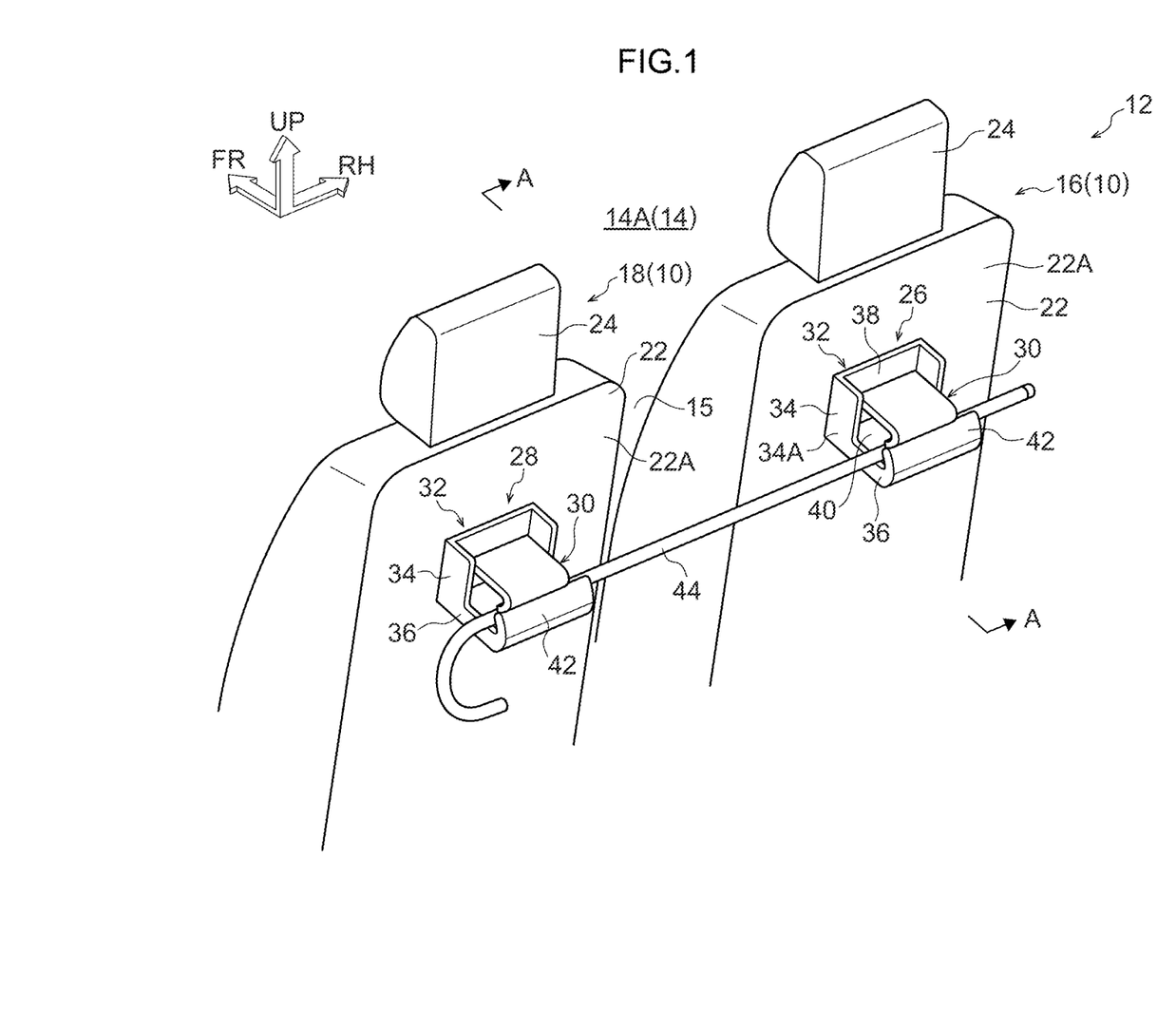
FIG. 1 is a perspective view in which vehicle seats according to a first exemplary embodiment are seen from an upper side diagonally from a rear-left side.

FIG. 1 is a perspective view in which vehicle seats 10 according to the present exemplary embodiment are seen from the upper side diagonally from the rear-left side. As shown in FIG. 1, the vehicle seats 10 include a pair of front seats 16 and 18. The front seats 16 and 18 are disposed at left and right in a front portion 14A of a cabin interior 14 of a vehicle 12, separated by a gap 15 in the vehicle width direction. The front seats 16 and 18 are each provided with a seat cushion 20 (see FIG. 4), a seatback 22 and a headrest 24. The seat cushion 20 supports the buttock area of a seat occupant, who is not shown in the drawings. The seatback 22 supports the back area of the seat occupant. The headrest 24 supports the head area of the seat occupant.

In the present exemplary embodiment, retaining portions 26 and 28 are provided at, respectively, the front seats 16 and 18. The retaining portions 26 and 28 are provided at sides of the seatbacks 22 at which rear faces 22A are provided. The retaining portion 26 has substantially the same structure as the retaining portion 28. Accordingly, in the descriptions below the retaining portion 26 is described, representing both the retaining portions 26 and 28.

The retaining portion 26 includes a cover portion 30 and a retaining portion 32. The cover portion 30 is formed in a rectangular flat plate shape in plan view. The retaining portion 32 is formed substantially in an "L" shape in side view. The retaining portion 32 includes a mounting portion 34 and a rest portion 36.

The mounting portion 34 is fixed to the rear face 22A of the seatback 22. A cross-sectional shape of the mounting portion 34 cut in the seat front-and-rear direction and the seat width direction is formed substantially in a "U" shape, in which a cutaway portion 38 opening to the rear side of the retaining portion 26 is formed. The rest portion 36 protrudes in a substantially horizontal direction toward the rear side from a lower end portion 34A of the mounting portion 34. A cross-sectional shape of the rest portion 36 cut in the seat vertical direction and the seat width direction is formed substantially in a "U" shape, in which a cutaway portion 40 opening to the upper side of the retaining portion 26 is formed.

A stopper 42 protrudes from the free end of the rest portion 36. The stopper 42 is inflected toward the upper side and the front side. A rod-shaped member such as a walking stick 44 or the like may be rested on the rest portion 36, and the walking stick 44 rested on the rest portion 36 may be abutted against the stopper 42. Hence, in the state in which the walking stick 44 is abutting against the stopper 42, movement of the walking stick 44 to the rear side is restricted.

Figure 2:
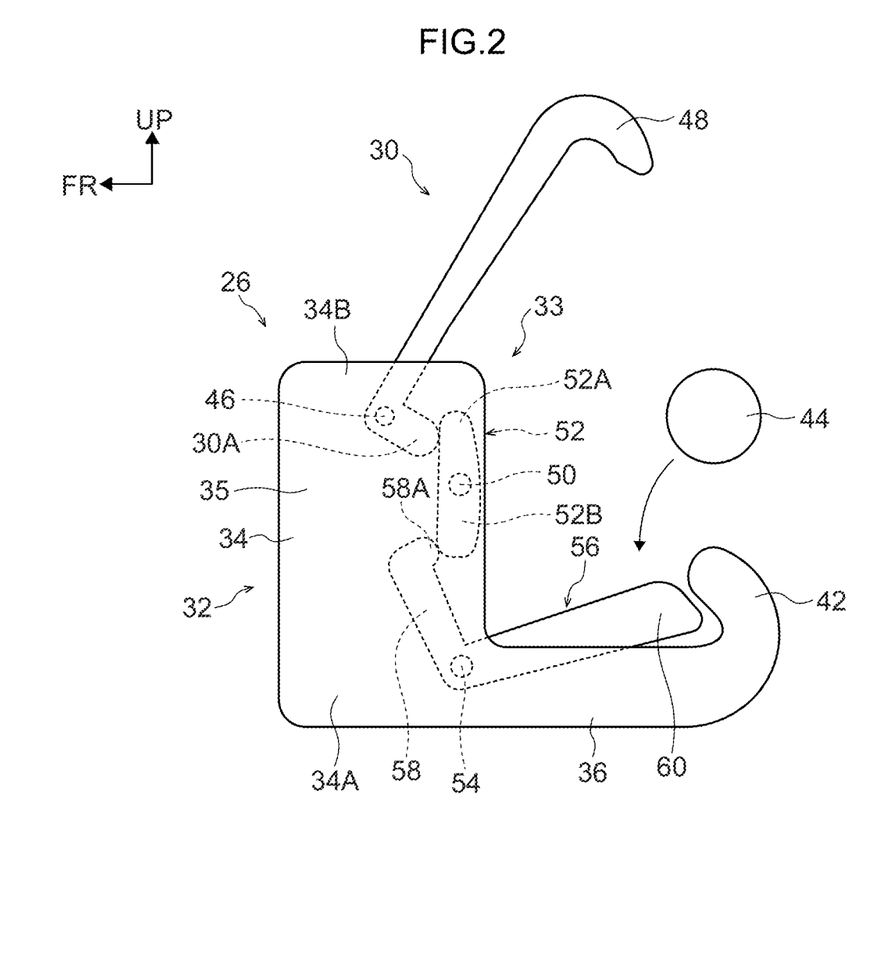
FIG. 2 is a side view showing a state in which a cover portion of a retaining portion provided at the vehicle seats according to the first exemplary embodiment is open.
Figure 3:
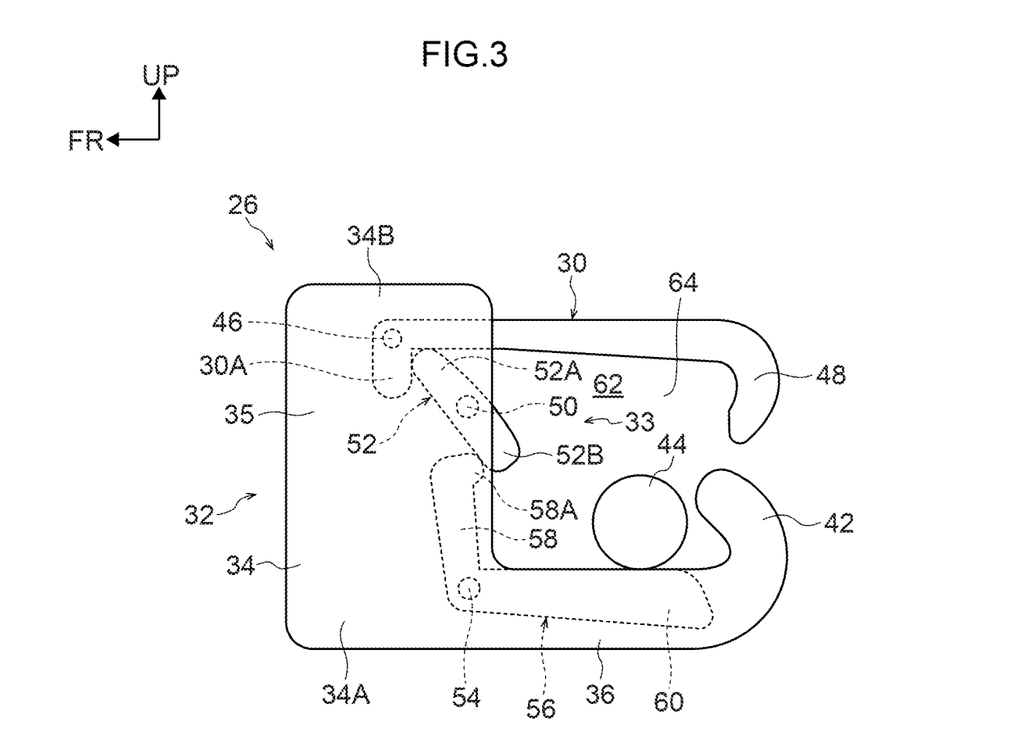
FIG. 3 is a side view showing a state in which the cover portion of the retaining portion provided at the vehicle seats according to the first exemplary embodiment is closed.

FIG. 2 is a side view showing a state in which the cover portion 30 constituting a portion of the retaining portion 26 is open. FIG. 3 is a side view showing a state in which the cover portion 30 constituting the portion of the retaining portion 26 is closed.

As shown in FIG. 2, an axle portion (a third axle portion) 46 along the width direction of the front seat 16 is provided at an upper end portion 34B of the mounting portion 34. The axle portion 46 is inserted through an inflected portion 30A that depends from a front end of the cover portion 30. The axle portion 46 enables turning of the cover portion 30 in the vertical direction about the axle portion 46. Thus, the cover portion 30 may be opened and closed relative to the rest portion 36. As shown in FIG. 3, the cover portion 30 can be opposed with the rest portion 36 vertically. A state in which the cover portion 30 is opposed with the rest portion 36 serves as the closed state of the cover portion 30.

A stopper 48 extends from the free end of the cover portion 30. In the state in which the cover portion 30 is opposed with the rest portion 36, the stopper 48 is inflected toward the lower side and the rear side. The stopper 48 opposes the stopper 42 vertically. Movement of the walking stick 44 to the rear side is restricted by the stopper 48 and the stopper 42.

An axle portion (a second axle portion) 50 along the width direction of the front seat 16 is provided at an upper portion 35 side of the mounting portion 34, to the lower-rear side of the axle portion 46. The axle portion 50 is inserted through a long plate-shaped seesaw member (pivot member) 52, which is arranged substantially in a vertical direction.

The seesaw member 52 constitutes a portion of a closing mechanism 33. The seesaw member 52 includes, centered on the axle portion 50, an upper portion (another end portion of the seesaw member) 52A and a lower portion (one end portion of the seesaw member) 52B. The seesaw member 52 is turnable in the front-and-rear direction about the axle portion 50.

An axle portion (a first axle portion) 54 along the width direction of the front seat 16 is provided at the lower end portion 34A of the mounting portion 34. The axle portion 54 is inserted through a pendulum member (rocker member) 56, which is formed substantially in an "L" shape in side view. The pendulum member 56 constitutes another portion of the closing mechanism 33. The pendulum member 56 is turnable in the vertical direction about the axle portion 54.

The pendulum member 56 includes a vertical wall portion (another end portion of the pendulum member) 58 and a horizontal wall portion (one end portion of the pendulum member) 60. The axle portion 54 penetrates through a region in which the vertical wall portion 58 and horizontal wall portion 60 intersect. The horizontal wall portion 60 can be accommodated in the cutaway portion 40 (see FIG. 1) formed in the rest portion 36, and the horizontal wall portion 60 can protrude from the rest portion 36 at a position that is lower than the stopper 42 in side view.

Accordingly, as shown in FIG. 2 and FIG. 3, when the walking stick 44 is rested on the horizontal wall portion 60 in the state in which the horizontal wall portion 60 is protruding from the rest portion 36, the horizontal wall portion 60 turns toward the lower side about the axle portion 54. When the walking stick 44 abuts against the rest portion 36, the horizontal wall portion 60 stops turning.

When the horizontal wall portion 60 turns toward the lower side as described above, the vertical wall portion 58 turns toward the rear side about the axle portion 54. An abutting portion 58A that protrudes toward the rear side is provided at the distal end of the vertical wall portion 58. The lower portion 52B of the seesaw member 52 is disposed in a movement path of the abutting portion 58A.

Therefore, the abutting portion 58A of the vertical wall portion 58 of the pendulum member 56 abuts against the lower portion 52B of the seesaw member 52 and the lower portion 52B of the seesaw member 52 turns toward the rear side. Correspondingly, the upper portion 52A of the seesaw member 52 turns toward the front side about the axle portion 50.

The inflected portion 30A of the cover portion 30 is disposed in a movement path of the upper portion 52A of the seesaw member 52. Therefore, when the upper portion 52A of the seesaw member 52 turns toward the front side and the upper portion 52A of the seesaw member 52 abuts against the inflected portion 30A of the cover portion 30, the cover portion 30 turns toward the lower side about the axle portion 46. As a result, the cover portion 30 opposes (and closes off) the rest portion 36, and the walking stick 44 is accommodated in an accommodating portion 62 formed by the cover portion 30 and the rest portion 36.

As shown in FIG. 3, the accommodating portion 62 is specified such that a gap 64 is provided between the accommodating portion 62 and the walking stick 44. Positions of the walking stick 44 in the seat vertical direction and the seat front-and-rear direction may be adjusted due to the gap 64 (as described below).

Moreover, because of the gap 64, different external dimensions of rod-shaped members such as the walking stick 44 and the like in accordance with types of the rod-shaped members can be tolerated to some extent. Respective cushion members (not shown in the drawings) may be provided at the sides of the cover portion 30 and the rest portion 36 at which the accommodating portion 62 is formed. Positional offsets between the retaining portion 26 and the retaining portion 28 may be absorbed by these cushion members, and contact noise between the walking stick 44 and the cover portion 30 and rest portion 36 due to vibrations may be absorbed by the cushion members. In addition, movement (sliding) of the walking stick 44 in the accommodating portion 62 may be suppressed by the cushion members.

—Operation and Effects of the Vehicle Seats—

Now, operation and effects of the vehicle seats according to the present exemplary embodiment are described.

In the present exemplary embodiment, as shown in FIG. 1, the retaining portions 26 and 28 are provided at the rear face 22A sides of the seatbacks 22 of the pair of front seats 16 and 18 that are disposed at left and right separated by the gap 15 in the vehicle width direction. The walking stick 44 can be disposed at the retaining portions 26 and 28 so as to span therebetween.

Figure 4:
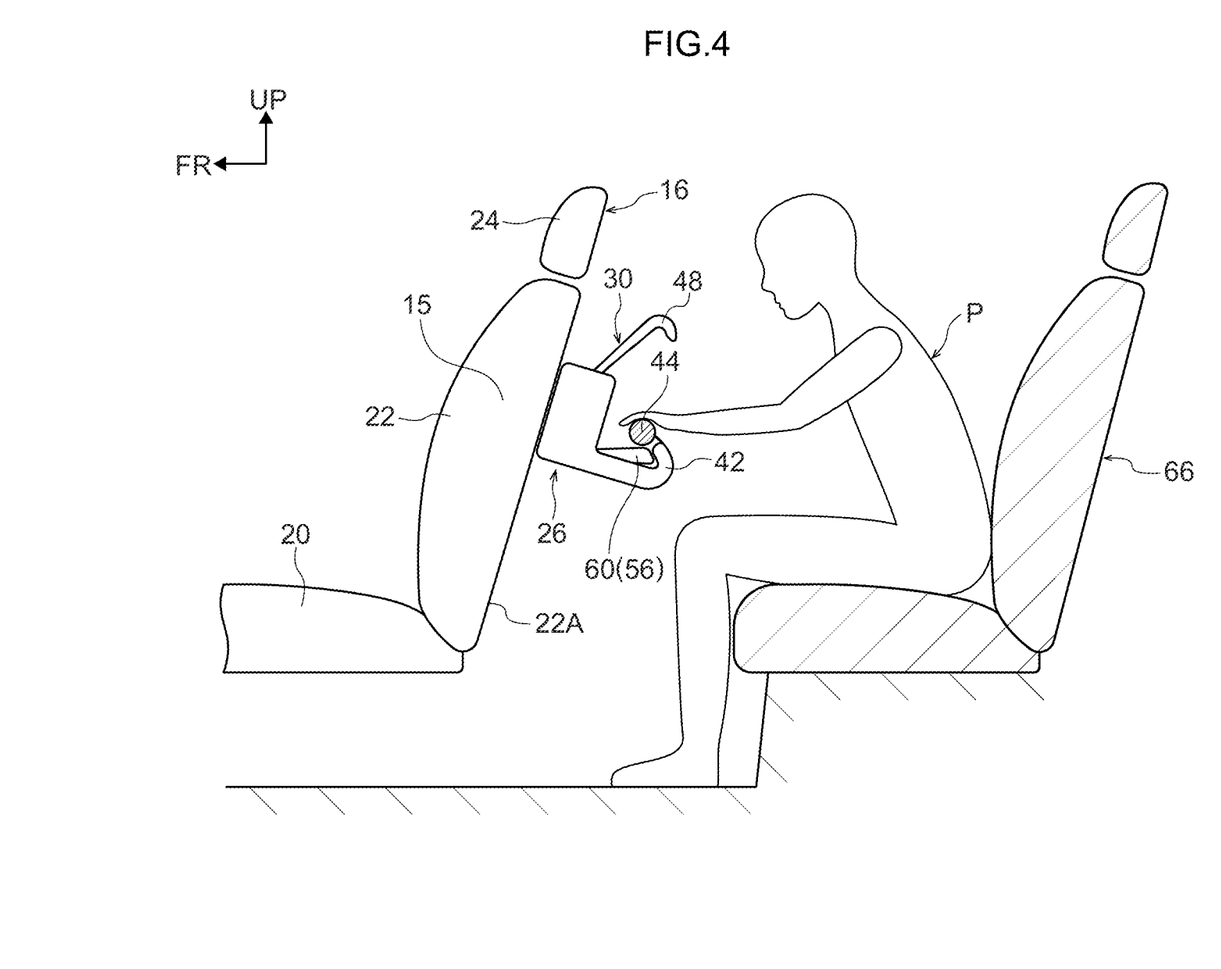
FIG. 4 is a sectional view cut along line A-A shown in FIG. 1.

FIG. 4 is a sectional view cut along line A-A shown in FIG. 1. As shown in FIG. 4, for example, when a vehicle occupant P is sitting on the middle seat of a bench seat 66 (the rear seat middle), the space provided between the front seat 16 and front seat 18 shown in FIG. 1 (the gap 15) is at the front side of the vehicle occupant P. Therefore, there is no dedicated assist grip at the front side of the vehicle occupant P.

Accordingly, as shown in FIG. 1 and FIG. 4, by the walking stick 44 being rested between the retaining portion 26 provided at the front seat 16 side and the retaining portion 28 provided at the front seat 18 side, the walking stick 44 is caused to span between the retaining portion 26 and the retaining portion 28. That is, the walking stick 44 is disposed in the space (the gap 15) formed between the front seat 16 and the front seat 18. Hence, in the present exemplary embodiment, the vehicle occupant P may grip the walking stick 44 and the vehicle occupant P may support their body with the walking stick 44.

Because the walking stick 44 spans between the front seat 16 and the front seat 18 in the present exemplary embodiment, even when the vehicle occupant P moves along the bench seat 66 in the vehicle width direction, the vehicle occupant P may support their body with the walking stick 44.

As shown in FIG. 1 and FIG. 3, the present exemplary embodiment is specified such that respective gaps 64 are formed between the walking stick 44 and the accommodating portion 62 of the retaining portion 26 provided at the seatback 22 of the front seat 16 and between the walking stick 44 and the accommodating portion 62 of the retaining portion 28 provided at the seatback 22 of the front seat 18. Positions of the walking stick 44 in the seat vertical direction and the seat front-and-rear direction may be adjusted due to these gaps 64.

As described above, in the present exemplary embodiment, the respective retaining portions 26 and 28 are provided at the rear face 22A sides of the seatbacks 22 of the front seats 16 and 18. As shown in FIG. 1, because the front seat 16 and the front seat 18 are separate, positions in the seat front-and-rear direction and the seat vertical direction of the front seats 16 and 18 may be different from one another in accordance with vehicle front-and-rear direction positions of the front seats 16 and 18 and reclining angles of the front seats 16 and 18.

However, the walking stick 44 is rested in the retaining portion 26 and the retaining portion 28. The present exemplary embodiment is specified such that the respective gaps 64 are formed between the accommodating portions 62 of the retaining portions 26 and 28 and the walking stick 44. Therefore, positional offsets between the retaining portion 26 and the retaining portion 28 in the seat front-and-rear direction and the seat vertical direction may be absorbed.

That is, in the present exemplary embodiment, even when positions in the seat vertical direction and positions in the seat front-and-rear direction are offset between the seatback 22 of the front seat 16 and the seatback 22 of the front seat 18, positions of the walking stick 44 may adjust thereto.

In the present exemplary embodiment, the retaining portions 26 and 28 are each provided with the rest portion 36 and the cover portion 30, the cover portions 30 oppose the rest portions 36, and the walking stick 44 is accommodated in the accommodating portions 62 formed by the cover portions 30 and the rest portions 36. In this state in which each cover portion 30 is opposed with the rest portion 36, the stopper 48 protrudes from the free end of the cover portion 30 and opposes the stopper 42 vertically, and movement of the walking stick 44 toward the rear side is restricted by the stopper 48 and the stopper 42. Therefore, in the present exemplary embodiment, falling of the walking stick 44 may be impeded.

In the present exemplary embodiment, the retaining portions 26 and 28 are each provided with the closing mechanism 33. Each closing mechanism 33 includes the pendulum member 56 and the seesaw member 52. As shown in FIG. 2 and FIG. 3, the pendulum member 56 is specified such that when the walking stick 44 is rested on the rest portion 36, the horizontal wall portion 60 of the pendulum member 56 is pressed by the walking stick 44 and the pendulum member 56 turns about the axle portion 54 provided along the vehicle width direction.

When the walking stick 44 is rested on the rest portion 36 and the pendulum member 56 turns about the axle portion 54, the vertical wall portion 58 of the pendulum member 56 abuts against the lower portion 52B of the seesaw member 52, and the seesaw member 52 turns about the axle portion 50 provided along the vehicle width direction. In addition, the upper portion 52A of the seesaw member 52 abuts against the inflected portion 30A of the cover portion 30, and the cover portion 30 turns in the direction to oppose the rest portion 36 about the axle portion 46 provided along the vehicle width direction.

That is, in the present exemplary embodiment, when the walking stick 44 is rested on the rest portions 36 of the retaining portions 26 and 28, each pendulum member 56 turns about the axle portion 54 via the horizontal wall portion 60 of the pendulum member 56, the vertical wall portion 58 of the pendulum member 56 abuts against the lower portion 52B of the seesaw member 52, and the seesaw member 52 turns about the axle portion 50. Hence, the upper portion 52A of the seesaw member 52 abuts against the cover portion 30, the cover portion 30 turns about the axle portion 46 in the direction to oppose the rest portion 36, and the cover portion 30 is closed.

Thus, in the present exemplary embodiment, when the walking stick 44 is rested on the rest portions 36, the cover portions 30 can be closed to the rest portions 36.

Figure 5:
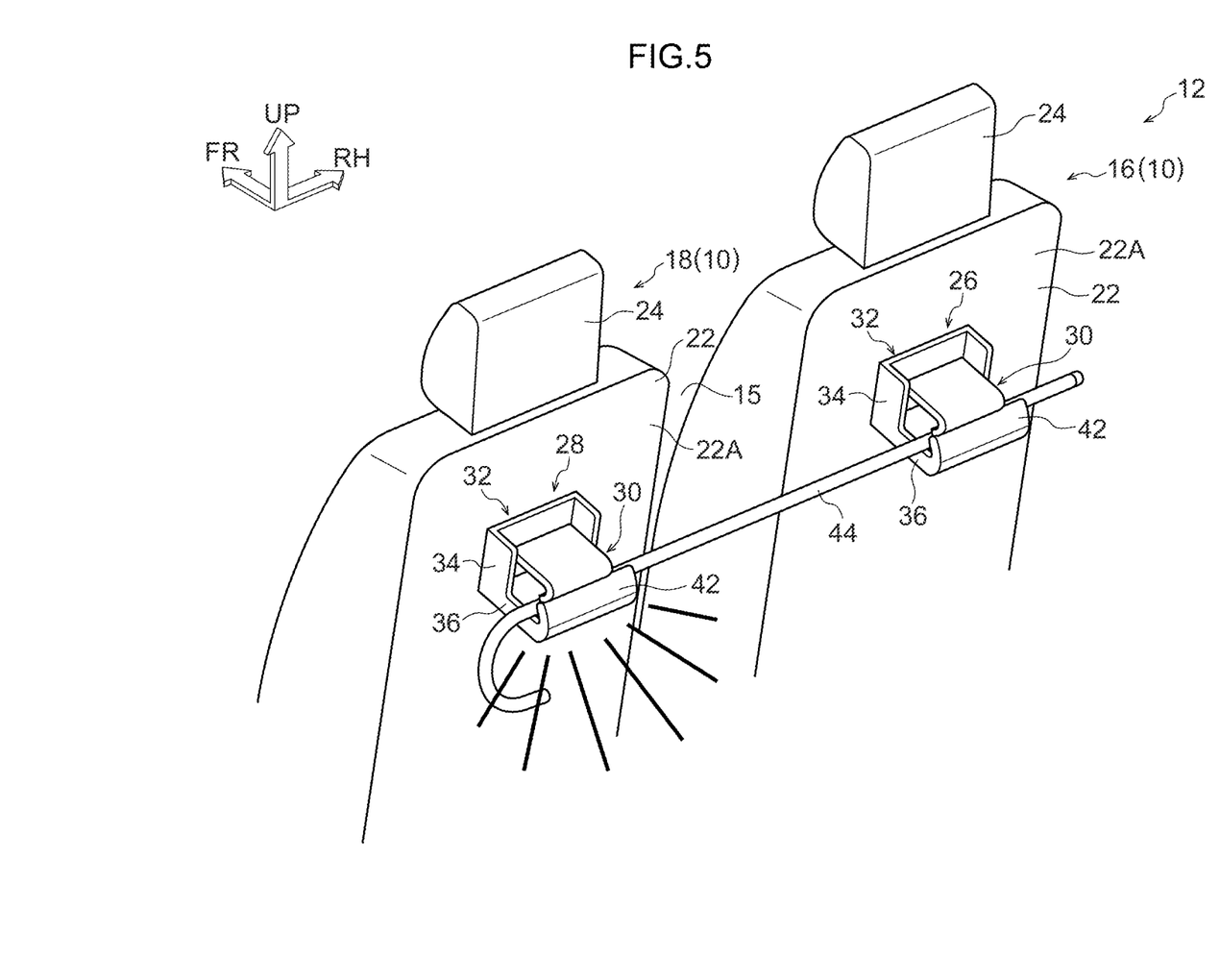
FIG. 5 is a perspective view, corresponding to FIG. 1, showing a first variant example of the vehicle seats according to the first exemplary embodiment.

Although not shown in the drawings, in addition to the structures described above, a detection sensor that detects the presence of the walking stick 44, such as a contact sensor or the like, may be provided at the rest portion 36. For example, as a first variant example, the detection sensor may be linked with a shift lever of the vehicle 12. When resting of the walking stick 44 on the rest portion 36 has been detected by the detection sensor and the shift lever is shifted to a parking position, the stopper 42 is caused to flash, as illustrated in FIG. 5. Thus, an alert may be given to a vehicle occupant such that the walking stick 44 is not forgotten in the cabin interior 14.

Alternatively, as a second variant example, a sitting sensor is provided at the bench seat side and the detection sensor is linked with the sitting sensor. When resting of the walking stick 44 on the rest portion 36 has been detected by the detection sensor and disembarking of a vehicle occupant is detected by the sitting sensor, an alarm may be set to sound. Thus, an alert may be given to the vehicle occupant such that the walking stick 44 is not forgotten in the cabin interior 14.

—Supplementary Notes on the First Exemplary Embodiment—

Figure 6:
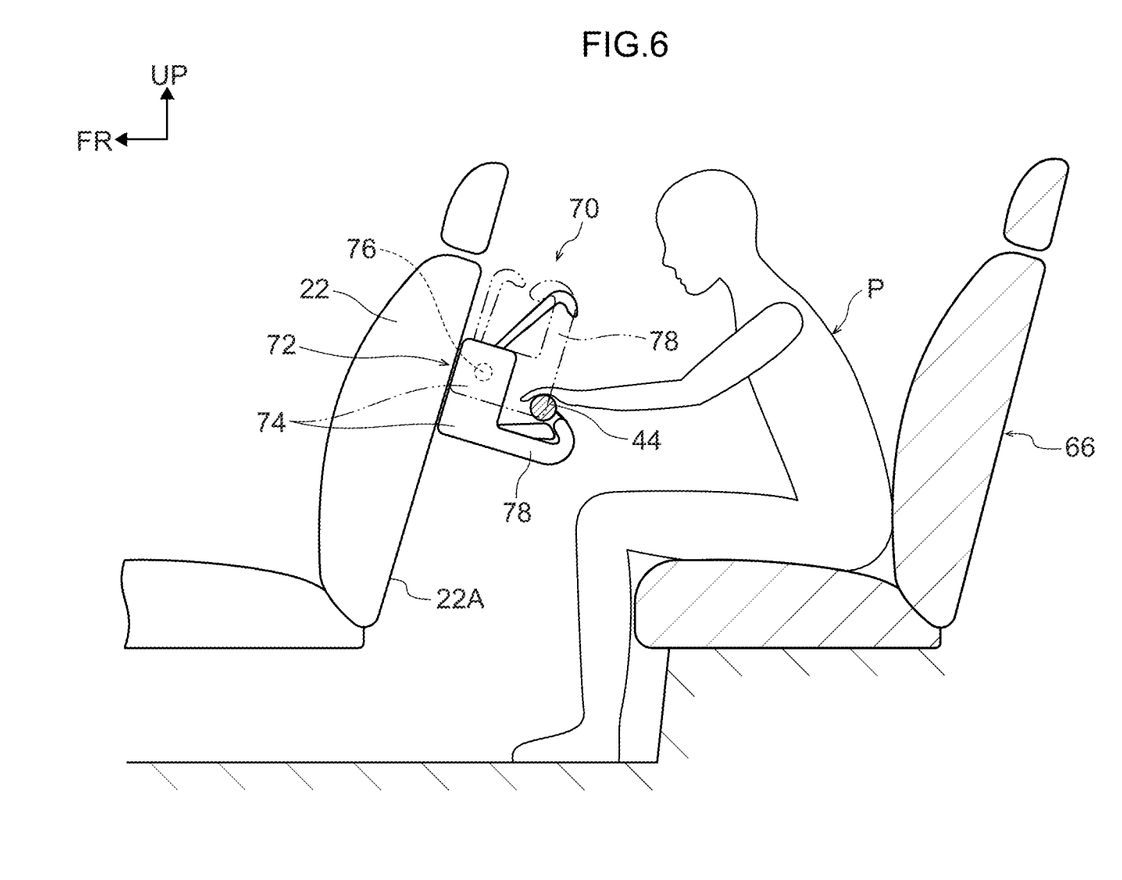
FIG. 6 is a side view, corresponding to FIG. 2, showing a second variant example of the vehicle seats according to the first exemplary embodiment.

In the first exemplary embodiment, as shown in FIG. 4, the mounting portion 34 of the retaining portion 26 is fixed to the rear face 22A of the seatback 22, but this is not limiting. For example, as illustrated in FIG. 6, a deployment and stowing mechanism 72 may be provided at a retaining portion 70. To describe this more specifically, a support portion 74 of the retaining portion 70 may be turned by the deployment and stowing mechanism 72 in the vertical direction about an axle portion 76. The axle portion 76 is provided at the rear face 22A of the seatback 22 and fixed along the width direction of the front seat 16.

In the present exemplary embodiment, when the retaining portion 70 is to be used, the support portion 74 and a rest portion 78 that is formed integrally with the support portion 74 are turned. Thus, the rest portion 78 is disposed substantially in a horizontal direction (which is referred to as a deployed state). As a result, use of the retaining portion 70 is enabled and the walking stick 44 may be rested on the rest portion 78. Hence, when the retaining portion 70 is not to be used, the support portion 74 and rest portion 78 are turned and the rest portion 78 is disposed substantially in the vertical direction (which is referred to as a stowed state). As a result, the retaining portion 70 is in a state that cannot be used (use is disabled).

In the present exemplary embodiment, the retaining portion 70 is turned in the vertical direction in a state in which the retaining portion 70 is protruding from the rear face 22A of the seatback 22. Alternatively, although not shown in the drawings, a recess portion may be provided in the rear face 22A of the seatback 22, and the retaining portion 70 may be stowed in the recess portion when the retaining portion 70 is not to be used. In this structure, when the retaining portion 70 does not protrude from the rear face 22A of the seatback 22, space for vehicle occupants sitting on the bench seat may be increased.

Second Exemplary Embodiment

Now, vehicle seats according to a second exemplary embodiment are described. Descriptions of details that are substantially the same as in the first exemplary embodiment are omitted.

Figure 7:
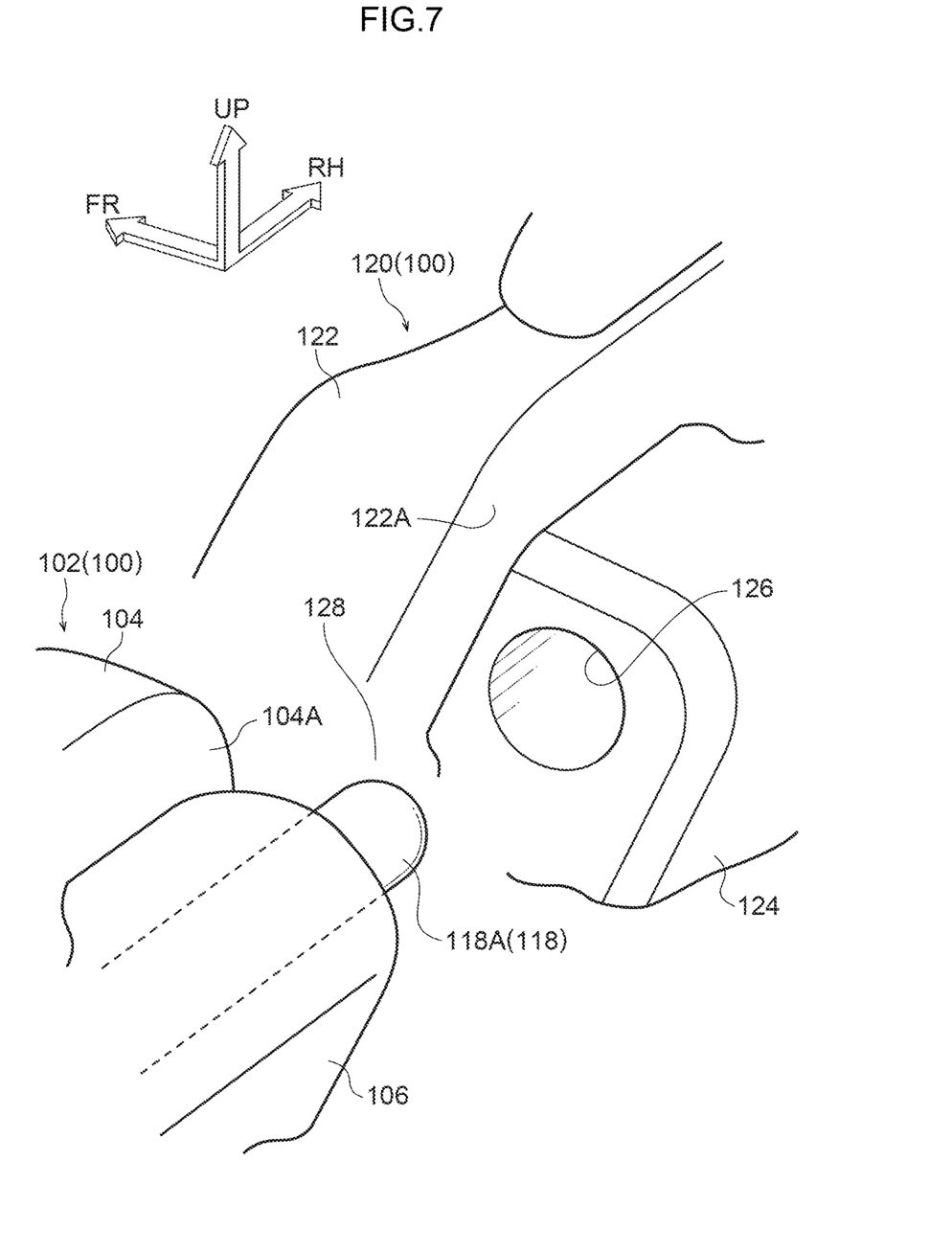
FIG. 7 is a magnified perspective view of principal portions in which principal portions of vehicle seats according to a second exemplary embodiment are magnified, seen from the upper side diagonally from the rear-left side and showing a state in which a rod-shaped member is protruding.

FIG. 7 is a perspective view of principal portions of vehicle seats 100 according to the present exemplary embodiment, seen from the upper side diagonally from the rear-left side.

As shown in FIG. 7, in the vehicle seats 100, an accommodating member 106 is provided along the seat width direction at the side of a seatback 104 of a front seat 102 at which a rear face 104A is provided. A rod-shaped member 118 with a cylindrical shape is accommodated in the accommodating member 106. The rod-shaped member 118 can protrude from the accommodating member 106 in the seat width direction.

As an example, although not shown in the drawings, a slot portion is formed along the seat width direction in the accommodating member 106, and a lever is provided protruding from the slot portion. Movement of the lever along the slot portion causes the rod-shaped member 118 to protrude from the accommodating member 106 in the seat width direction. A hole portion is formed along the seat vertical direction at the side of the slot portion at which a front seat 120 is disposed. The hole portion is continuous with the slot portion. Accommodation of the lever in the hole portion restricts movement of the rod-shaped member 118 in the seat width direction. The rod-shaped member 118 is accommodated in the accommodating member 106 by the lever being moved from the hole portion to the slot portion and moved along the slot portion in the direction away from the front seat 120. That is, by the lever being moved by hand, the rod-shaped member 118 is caused to protrude from the accommodating member 106 in the seat width direction or is accommodated in the accommodating member 106.

As an alternative example, although not shown in the drawings, a solenoid is accommodated in the accommodating member 106. A plunger that can be protruded from a housing constituting a main body of the solenoid is coupled with the rod-shaped member 118. A switch is provided in the cabin. When the switch is turned on, voltage is applied to the solenoid. Thus, when the switch is turned on, the plunger protrudes from the housing and, accordingly, the rod-shaped member 118 protrudes from the accommodating member 106. When the switch is turned off, no voltage is applied to the solenoid. As a result, the plunger is accommodated into the housing by a return spring, and the rod-shaped member 118 is accommodated into the accommodating member 106. That is, by the switch being turned on or off, the rod-shaped member 118 can be caused to protrude from the accommodating member 106 or be accommodated in the accommodating member 106.

Further, although not shown in the drawings, a switch and a side door are linked with a vehicle interior camera or the like. When a vehicle occupant opens the side door in order to board the vehicle, the switch turns on and the rod-shaped member 118 protrudes from the accommodating member 106. When the vehicle occupant disembarks and closes the side door, the switch turns off and the rod-shaped member 118 is accommodated into the accommodating member 106. That is, the rod-shaped member 118 can be caused to protrude from the accommodating member 106 or be accommodated in the accommodating member 106 automatically.

In the present exemplary embodiment, the rod-shaped member 118 is accommodated in the accommodating member 106 to be capable of protruding in the seat width direction. In the accommodated state of the rod-shaped member 118, the rod-shaped member 118 may be accommodated in a state that does not protrude from the accommodating member 106 to the cabin interior side of the accommodating member 106, and may be accommodated in a state in which a portion of the rod-shaped member 118 protrudes to the cabin interior side from the accommodating member 106.

At a seatback 122 of the front seat 120, a support member 124 is provided along the seat width direction at the side of the seatback 122 at which a rear face 122A is provided. A substantially cylindrical cavity portion 126 is formed in a side of the support member 124 that opposes the accommodating member 106. The cavity portion 126 is recessed in the seat width direction.

Figure 8:
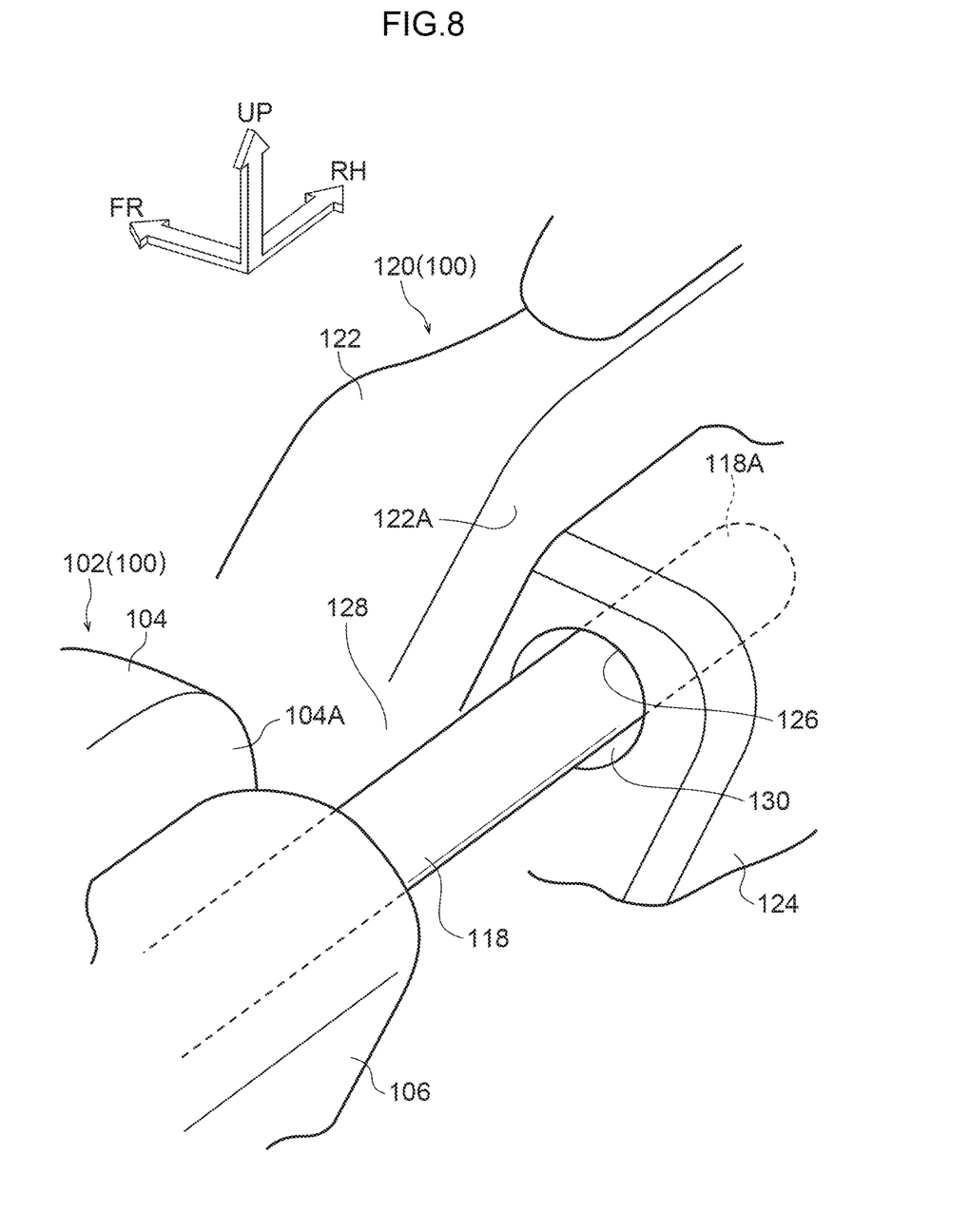
FIG. 8 is a magnified perspective view of principal portions in which the principal portions of the vehicle seats according to the second exemplary embodiment are magnified, seen from the upper side diagonally from the rear-left side and showing a state in which a distal end portion of the rod-shaped member is supported.

As shown in FIG. 8, a distal end portion 118A of the rod-shaped member 118 can be inserted into the cavity portion 126. In the state in which the distal end portion 118A of the rod-shaped member 118 is inserted into the cavity portion 126, the rod-shaped member 118 spans in the seat width direction between the front seat 102 and the front seat 120.

Thus, the rod-shaped member 118 is disposed in a space (gap) 128 formed between the front seat 102 and the front seat 120. Therefore, a vehicle occupant P sitting on the middle seat (rear seat middle) of the bench seat 66 (see FIG. 4) may grip the rod-shaped member 118, and the vehicle occupant P may support their body with the rod-shaped member 118.

An inner diameter dimension of the cavity portion 126 is specified to be larger than an outer diameter dimension of the rod-shaped member 118. Thus, in the state in which the distal end portion 118A of the rod-shaped member 118 is inserted into the cavity portion 126, a gap 130 is formed between the rod-shaped member 118 and the cavity portion 126. Positional offsets, in accordance with positions of the front seats 102 and 120 in the vehicle front-and-rear direction and reclining angles of the front seats 102 and 120, between the accommodating member 106 and the support member 124 in the seat front-and-rear direction and the seat vertical direction may be absorbed by the gap 130.

That is, even when positions in the seat vertical direction and positions in the seat front-and-rear direction are offset between the seatback 104 of the front seat 102 and the seatback 122 of the front seat 120, the positions of the rod-shaped member 118 may adjust thereto. Similarly to the retaining portions 26 and 28, cushion members (which are not shown in the drawings) may be provided in the cavity portion 126 formed in the support member 124. Similarly to the retaining portions 26 and 28, cushion members (which are not shown in the drawings) may be provided in the cavity portion 126 formed in the support member 124.

—Supplementary Notes on the Second Exemplary Embodiment—

In the second exemplary embodiment, as shown in FIG. 7 and FIG. 8, the accommodating member 106 in which the rod-shaped member 118 is accommodated is provided along the seat width direction at the side of the seatback 104 of the front seat 102 at which the rear face 104A is provided, and the rod-shaped member 118 can protrude in the seat width direction. However, this is not limiting.

For example, although not shown in the drawings, an axle portion whose axial direction is in the vehicle front-and-rear direction may be provided at the side of the seatback 122 of the front seat 120 at which the rear face 122A is provided. An upper end portion (proximal end portion) of a rod-shaped member may be supported at the axle portion. In this structure, the rod-shaped member is turnable about the upper end portion thereof in the vehicle width direction and the vehicle vertical direction. Sliding resistance is provided between the upper end portion of the rod-shaped member and the axle portion. Thus, the axle portion is specified such that the rod-shaped portion does not swing during running of the vehicle.

Meanwhile, a receiving portion equipped with, for example, a push latch mechanism is provided at the side of the seatback 104 of the front seat 102 at which the rear face 104A is provided. When pushed, the receiving portion is caused to protrude to the vehicle rear side, and a lower end portion (distal end portion) of the rod-shaped member can be retained by the receiving portion. The receiving portion is not limited to a push latch mechanism and may be a collapsible structure.

According to the structure described above, because the distal end portion of the rod-shaped member is retained by the receiving portion, the rod-shaped member spans between the pair of seatbacks 104 and 122. Therefore, in the present exemplary embodiment, a vehicle occupant sitting at the rear seat middle may grip the rod-shaped member, and the vehicle occupant may support their body by gripping the rod-shaped member.

In the present exemplary embodiment, because the upper end portion of the rod-shaped member is supported by the axle portion, the lower end side of the rod-shaped member serves as a free end side. A position of the axle portion in the vehicle vertical direction is specified at an upper portion side of the seatback, with consideration for a height at which the vehicle occupant grips the rod-shaped member. Thus, the upper end portion of the rod-shaped member is supported to assure space for turning of the rod-shaped member. Alternatively, given that it is sufficient that space for turning of the rod-shaped member may be assured, it is clear that the lower end portion side of the rod-shaped member may be supported by the axle portion.

Exemplary embodiments of the present disclosure are described hereabove. However, the present disclosure is not limited by these descriptions and it will be clear that numerous modifications beyond these descriptions may be embodied within a technical scope not departing from the gist of the disclosure.

What is claimed is:

1. Vehicle seats comprising:
   a pair of seatbacks of front seats spaced apart in a vehicle width direction; and
   a pair of retaining portions extending rearward from rear face sides of the pair of seatbacks, the pair of retaining portions configured to allow a rod-shaped member to span between the seatbacks, the rod-shaped member being grippable by a vehicle occupant sitting at a rear seat middle, each of the pair of retaining portions includes a cover portion pivotally coupled to the retaining portions for movement between an open position and a closed position.

2. The vehicle seats according to claim 1, wherein the rod-shaped member is retained at the retaining portions in a state in which gaps in a seat vertical direction and a seat front-rear direction are present between the rod-shaped member and the retaining portions.

3. The vehicle seats according to claim 1, wherein each retaining portion includes a rest portion on which the rod-shaped member is to be rested; and
   wherein each of the cover portions are opposable with the rest portion, in the closed position the cover portion is disposed to oppose the rest portion to impede a fall of the rod-shaped member.

4. The vehicle seats according to claim 1, wherein the pair of retaining portions include:
   an accommodating member structuring one of the retaining portions, the accommodating member being provided at one of the pair of seatbacks and accommodating the rod-shaped member, such that the rod-shaped member protrudes from the accommodating member in a seat width direction; and
   a support member structuring another of the retaining portions, the support member being provided at another of the pair of seatbacks and supporting a distal end portion of the rod-shaped member protruding from the accommodating member.

5. The vehicle seats according to claim 3, wherein a deployment and stowing mechanism is provided at each retaining portion, the deployment and stowing mechanism putting each retaining portion into either a deployed state in which use of the retaining portion is enabled or a stowed state in which use of the retaining portion is disabled.

6. The vehicle seats according to claim 3, wherein each retaining portion further includes a closing mechanism that closes the cover portion to be opposable with the rest portion, the closing mechanism including:
   a pendulum member including one end portion, another end portion and a first axle portion that is provided along the vehicle width direction, the one end portion being pressed by the rod-shaped member and the pendulum member turning about the first axle portion in a case in which the rod-shaped member is rested on the rest portion; and
   a seesaw member including one end portion, another end portion and a second axle portion that is provided along the vehicle width direction, and in a case in which the rod-shaped member is rested on the rest portion and the pendulum member turns about the first axle portion,
   the other end portion of the pendulum member abutting against the one end portion of the seesaw member,
   the seesaw member turning about the second axle portion, and
   the other end portion of the seesaw member abutting against the cover portion and causing the cover portion to turn about a third axle portion in a direction to oppose the rest portion, the third axle portion being provided along the vehicle width direction.

7. Vehicle seats comprising:
   a pair of seatbacks of front seats spaced apart in a vehicle width direction; and a pair of retaining portions provided at rear face sides of the pair of seatbacks, the pair of retaining portions configured to allow a rod-shaped member to span between the seatbacks, the rod-shaped member being grippable by a vehicle occupant sitting at a rear seat middle, each of the pair of retaining portions includes:
a rest portion on which the rod-shaped member is to be rested;
a cover portion that is opposable with the rest portion, the cover portion being closed and impeding a fall of the rod-shaped member in a state in which the cover portion is disposed to oppose the rest portion; and
a deployment and stowing mechanism provided at each of the pair of retaining portions, the deployment and stowing mechanism putting each retaining portion into either a deployed state in which use of the retaining portion is enabled or a stowed state in which use of the retaining portion is disabled.

8. The vehicle seats according to claim 7, wherein the rod-shaped member is retained at the retaining portions in a state in which gaps in a seat vertical direction and a seat front-rear direction are present between the rod-shaped member and the retaining portions.

9. The vehicle seats according to claim 7, wherein the pair of retaining portions include:
an accommodating member structuring one of the retaining portions, the accommodating member being provided at one of the pair of seatbacks and accommodating the rod-shaped member, such that the rod-shaped member protrudes from the accommodating member in a seat width direction; and
a support member structuring another of the retaining portions, the support member being provided at another of the pair of seatbacks and supporting a distal end portion of the rod-shaped member protruding from the accommodating member.

10. Vehicle seats comprising:
a pair of seatbacks of front seats spaced apart in a vehicle width direction; and
a pair of retaining portions provided at rear face sides of the pair of seatbacks, the pair of retaining portions configured to allow a rod-shaped member to span between the seatbacks, the rod-shaped member being grippable by a vehicle occupant sitting at a rear seat middle, each of the pair of retaining portions includes:
a rest portion on which the rod-shaped member is to be rested;
a cover portion that is opposable with the rest portion, the cover portion being closed and impeding a fall of the rod-shaped member in a state in which the cover portion is disposed to oppose the rest portion; and
a closing mechanism that closes the cover portion to be opposable with the rest portion, the closing mechanism including:
a pendulum member including one end portion, another end portion and a first axle portion that is provided along the vehicle width direction, the one end portion being pressed by the rod-shaped member and the pendulum member turning about the first axle portion in a case in which the rod-shaped member is rested on the rest portion; and
a seesaw member including one end portion, another end portion and a second axle portion that is provided along the vehicle width direction, and in a case in which the rod-shaped member is rested on the rest portion and the pendulum member turns about the first axle portion,
the other end portion of the pendulum member abutting against the one end portion of the seesaw member,
the seesaw member turning about the second axle portion, and
the other end portion of the seesaw member abutting against the cover portion and causing the cover portion to turn about a third axle portion in a direction to oppose the rest portion, the third axle portion being provided along the vehicle width direction.

11. The vehicle seats according to claim 10, wherein the rod-shaped member is retained at the retaining portions in a state in which gaps in a seat vertical direction and a seat front-rear direction are present between the rod-shaped member and the retaining portions.

12. The vehicle seats according to claim 10, wherein the pair of retaining portions include:
an accommodating member structuring one of the retaining portions, the accommodating member being provided at one of the pair of seatbacks and accommodating the rod-shaped member, such that the rod-shaped member protrudes from the accommodating member in a seat width direction; and
a support member structuring another of the retaining portions, the support member being provided at another of the pair of seatbacks and supporting a distal end portion of the rod-shaped member protruding from the accommodating member.

* * * * *